United States Patent
MacInnis et al.

(10) Patent No.: US 8,861,602 B2
(45) Date of Patent: Oct. 14, 2014

(54) MOTION VECTOR RECONSTRUCTION IN AN ENTROPY DECODER

(75) Inventors: Alexander MacInnis, Lake Oswego, OR (US); Ramkumar Prakasam, Santa Clara, CA (US); Sheng Zhong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 2052 days.

(21) Appl. No.: 11/154,325

(22) Filed: Jun. 16, 2005

(65) Prior Publication Data
US 2005/0281336 A1    Dec. 22, 2005

Related U.S. Application Data

(60) Provisional application No. 60/582,278, filed on Jun. 22, 2004.

(51) Int. Cl.
*H04N 7/12* (2006.01)
*H04N 5/14* (2006.01)

(52) U.S. Cl.
CPC .................... *H04N 5/145* (2013.01)
USPC ....................................... 375/240.16

(58) Field of Classification Search
USPC ............... 375/240, 240.01, 240.03, 240.12, 375/240.16, 240.15; 382/236; 341/51
See application file for complete search history.

(56) References Cited

U.S. PATENT DOCUMENTS

| | | | | |
|---|---|---|---|---|
| 5,717,394 A | * | 2/1998 | Schwartz et al. | 341/51 |
| 5,920,353 A | * | 7/1999 | Diaz et al. | 375/240.15 |
| 5,991,447 A | * | 11/1999 | Eifrig et al. | 382/236 |
| 6,122,321 A | * | 9/2000 | Sazzad et al. | 375/240.03 |
| 6,983,018 B1 | * | 1/2006 | Lin et al. | 375/240.16 |

* cited by examiner

*Primary Examiner* — Allen Wong
(74) *Attorney, Agent, or Firm* — Foley & Lardner LLP

(57) ABSTRACT

Presented herein are system(s), method(s), and apparatus for motion vector reconstruction in an entropy decoder. In one embodiment of the present invention, there is presented a method for decoding a bitstream. The method comprises reconstructing at least one motion vector from the bitstream at a first stage in a pipeline; and entropy decoding the bitstream with the at least one reconstructed motion vector at the first stage.

22 Claims, 5 Drawing Sheets

MOTION VECTOR RECONSTRUCTION IN AN ENTROPY DECODER

CLAIM OF PRIORITY

This application claims priority to Provisional Application for U.S. patent Ser. No. 60/582,278, "Motion Vector Reconstruction in an Entropy Preprocessor", filed Jun. 22, 2004, by MacInnis, which is incorporated herein by reference for all purposes.

FEDERALLY SPONSORED RESEARCH OR DEVELOPMENT

Not Applicable

MICROFICHE/COPYRIGHT REFERENCE

Not Applicable

BACKGROUND OF THE INVENTION

Digital video compression and decompression systems are generally required to comply with the applicable standards in order to ensure interoperability with other products following the same standards. Video compression standards are continuing to evolve, and as they do so they are becoming more complex. At the same time, the performance requirements of digital video decoders ("decoders") and digital video encoders ("encoders") are increasing, to support high definition and other requirements and the performance requirements are compounded by the growing complexity of the video standards. Also, cost pressures on video decoders and encoders is tremendous, and the increased complexity and performance needs to be provided in very small and low power implementations in order to meet the cost objectives.

The issues of performance, complexity and cost in decoders and encoders may be further compounded by certain details of some video standards. In some cases, new video standards are developed by a process of algorithmic analysis and experimentation and development of software that runs on fast general purpose processors, such as the latest generation of personal computers. When such algorithms are ported to low cost, low power devices that are suitable for mass production, often problems arise resulting from the lack of suitability of the algorithms to such devices.

Low cost decoders and encoders generally use pipelined architectures in order to achieve the required levels of performance in reasonable device sizes and with reasonable power requirements, which generally dictate modest clock rates. Pipeined designs generally split different functions into different stages as well as into different modules. Each, module may use multiple pipeline stages. Some video formats have aspects which are incompatible with pipelined decoder and encoder architectures.

An example of such an incompatibility is the HYBRIDPRED syntax element in the SMPTE VC-1 draft standard and also in the Microsoft Windows Media Video 9 format, which is similar to VC-1 (previously known as VC-9). The presence of the HYBRIDPRED syntax element is conditional and it depends on the values of reconstructed luma motion vectors, which are generally processed in a later pipeline stage than the processing of the input bit stream in a pipelined decoder design. Therefore it is generally not possible to parse the input bit stream in one pipeline stage and reconstruct motion vectors in a subsequent pipeline stage, due to the aforementioned dependency. A representative specification of the SMPTE VC-1 draft standard is C24.008-VC1-Spec-CD1r5.pdf. The process of hybrid motion vector prediction using the HYBRIDPRED syntax element is specified in section 8.3.5.3.5.

In other designs, there is one processor performing essentially all decoding functions. A primary example is a personal computer executing software to decode digital video. With one processor performing all decoding functions, operations such as entropy decoding and motion vector reconstruction are naturally performed at different times as the processor executes different parts of the software, and the dependency of entropy decoding on the reconstructed motion vectors is met by having the processor reconstruct motion vectors as needed before parsing the HYBRIDRED syntax element. Such designs are not referred to herein as being pipelined.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be found in system (s), method(s), and apparatus for motion vector reconstruction in an entropy decoder, substantially as shown in and/or described in connection with at least one of the figures, as set forth more completely in the claims.

These and other advantages and novel features of the present invention, as well as details of an illustrated embodiment thereof, will be more fully understood from the following description and drawings.

DETAILED DESCRIPTION OF THE INVENTION

Figure 1:
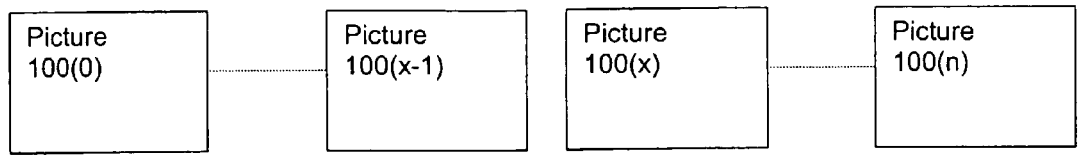
FIG. 1 is a block diagram describing an exemplary encoded video.
Figure 1:
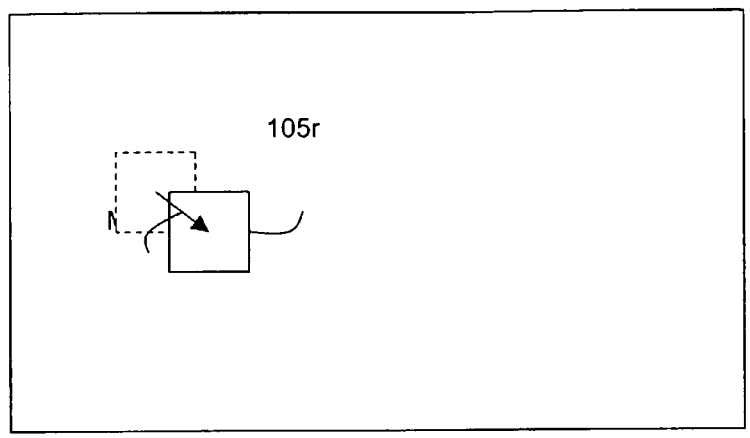
Figure 1:
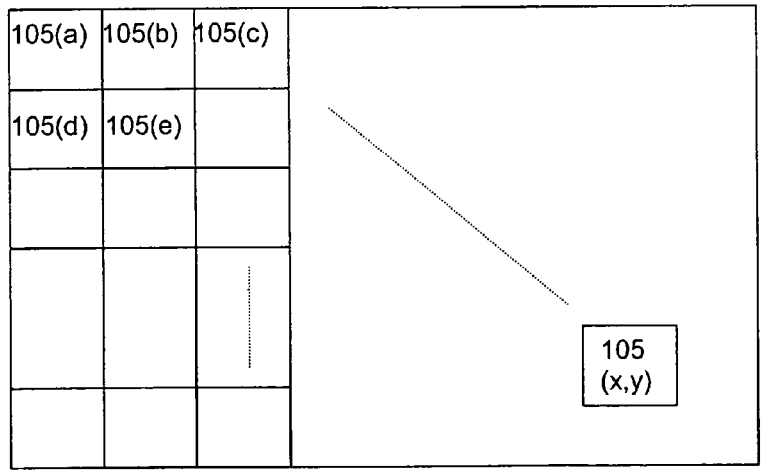
Figure 1:
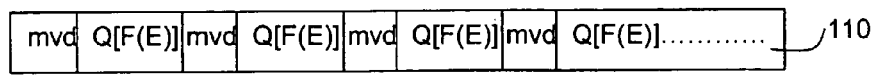

Referring now to FIG. 1 there is illustrated a block diagram describing an exemplary encoded video 100. The video 100 comprising a series of pictures 100(0) . . . 100(n) can be encoded by dividing the pictures into blocks 105(x,y). Proximate pictures 100(0) . . . 100(n) that are captured at proximate times are likely to have similarities. Moreover, most of the differences between proximate pictures are usually due to the movement of objects within the pictures. Accordingly, similar reference blocks 105r to the blocks 105(x,y) of a picture 100(x) can be found or interpolated from another proximate picture 100(x−1).

The blocks 105(x,y) are represented as the difference (known as the prediction error E) between the blocks 105(x,y) and the reference blocks 105r and an identification of the reference block 105r. The reference block 105r is identified by what is known as a motion vector MV. The motion vector MV describes the spatial displacement between the block $105(x,y)$ and the reference block $105r$. According to certain standards, such as VC-1, the blocks $105(x,y)$ are between 2×2 to 16×16 pixels in size. In a high-definition video, even a 16×16 block $105(x,y)$ represents a very small portion of the picture 100, Thus, it is likely that a moving object in a picture 100 would be represented by a large number of blocks $105(x, y)$.

Therefore, blocks that are in close proximity to each other, e.g., blocks 105a-e are likely to be part of the same object in the video with similar movement. Therefore, the motion vectors MV for each of the blocks 105a-e are likely to be similar as well. Accordingly, motion vector(s) for block 105e can often be predicted from the motion vectors of neighboring blocks 105a-d.

The motion vector MV of block 105e can be predicted from the motion vectors of neighboring blocks 105a-d in a variety of ways. Accordingly, the mode can be indicated. The mode of prediction can also change. The motion vectors are generally represented by motion vector deltas mvd, in combination with motion vector predictors, which are specified in the VC-1 standard.

The prediction error E can then be transformed to the frequency domain F(E), and quantized Q[F(E)]. The motion vector deltas mvd and the quantized and transformed prediction error Q[F(E) ], along with other syntax elements can be entropy encoded into a bitstream 110 with the other blocks 105 of the picture 100( ).

Low cost decoders generally use a pipelined architecture in order to recover the video data 100 from the bitstream 110. Pipelined designs generally split different functions into different stages as well as into different modules. For example, a pipeline may include different modules for entropy decoding, inverse quantizing, and inverse transforming.

In certain standards, the presence of certain syntax elements in the bitstream 110 depends on data that is recovered from a different function. For example, in VC-1, the presence of the HYBRIDPRED syntax element is determined from a comparison of the values of motion vector predictors, which are functions of reconstructed motion vectors. To improve the throughput of the pipeline, the motion vectors can also be reconstructed with the entropy decoding.

Figure 2:
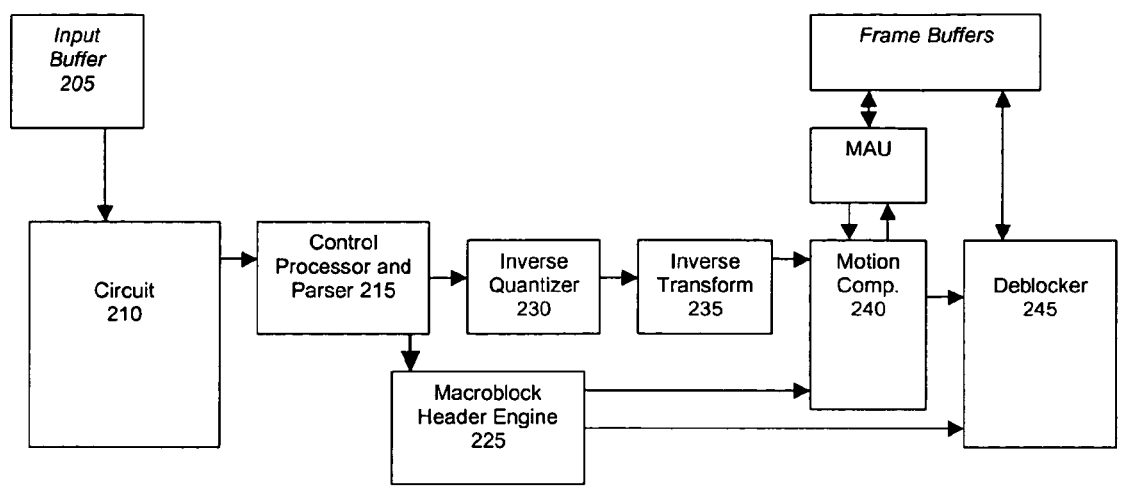
FIG. 2 is a block diagram of an exemplary pipeline in accordance with an embodiment of the present invention.

Referring now to FIG. 2, there is illustrated a block diagram of an exemplary pipline 200 for recovering video data from a bitstream 110. The pipeline 200 receives the bitstream 110 in an input buffer 205. Circuit 210 decodes the entropy encoding of the bitstream 110. However, in order to decode the entropy encoding of the bitstream 110, the circuit 210 reconstructs the motion vectors MV from the motion vector deltas mvd. The motion vectors MV are reconstructed to detect the presence of certain syntax elements, such as HYBRIDPRED in VC-1.

In certain embodiments of the present invention, the circuit 210 provides the syntax elements, as well as reconstructed motion vectors MV to the control processor and parser 215. Alternatively, the circuit 210 can use the reconstructed motion vectors MV strictly for entropy decoding, and discard the motion vectors. In certain embodiments, the circuit 210 can reconstruct the motion vectors MV that are needed for the entropy decoding.

The control processor and parser 215 provides the reconstructed motion vectors MV to the macroblock header engine 225, and the quantized, transformed, prediction error Q[F(E)] to the inverse quantizer 230. The inverse quantizer 230 and inverse transformer 235 recover the prediction error E. Where the circuit 210 discards the reconstructed motion vectors MV or reconstructs a portion of the motion vectors MV, the control processor and parser 215 can provide the motion vector deltas mvd to the macroblock header engine 225, and the macroblock header engine 225 can reconstruct the motion vectors MV.

The motion compensator 240 receives the motion vectors MV from the macroblock header engine 225 and the prediction error E from the inverse transformer 235. The motion compensator 240 uses the motion vectors MV to fetch the previously decoded reference blocks from frame buffers, via a memory access unit MAU. The motion compensator 240 may perform interpolation operations on the reference blocks and combines the reference blocks with the prediction error E to produce reconstructed blocks of reconstructed pictures. A deblocker 245 performs a deblocking operation on the reconstructed pictures.

In certain embodiments of the present invention, the pipeline 200 can operate on a plurality of blocks 105. For example, the circuit 210, the control processor and parser 215, inverse quantizer 230, inverse transformer 235, motion compensator 240, and deblocker 245 can operate on different blocks 105. When the foregoing have finished their respective operations, the blocks 105 can be provided to the next stage.

Figure 3:
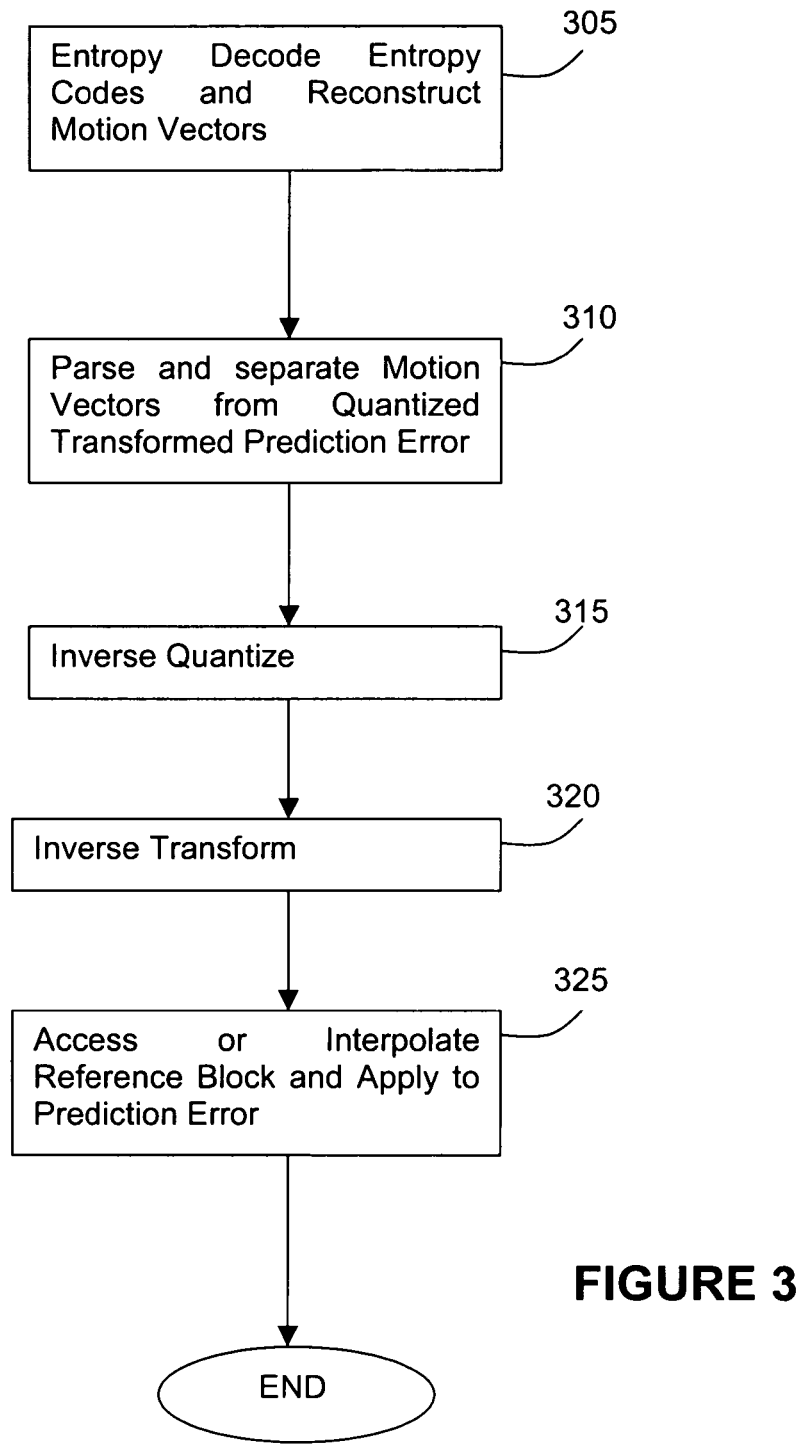
FIG. 3 is a flow diagram for decoding a bit stream in accordance with an embodiment of the present invention.

Referring now to FIG. 3, there is illustrated a flow diagram for decoding the bitstream 110. At 305, the circuit 210 decodes the entropy coding and reconstructs the motion vectors Mv. The circuit 210 can use the reconstructed motion vectors MV for the entropy decoding. At 310, the control processor and parser 215 parses syntax elements and separates the reconstructed motion vectors MV from the quantized transformed prediction error Q[F(E)]. The control processor and parser 215 provides the reconstructed motion vectors MV to the macroblock header engine 325, and the quantized transformed prediction error Q[F(E)] to the inverse quantizer 230. At 315, the inverse quantizer 230 inverse quantizes the quantized transformed prediction error Q[F(E)], resulting in the transformed prediction error F(E). At 320, the immerse transformer 235 inverse transforms the transformed prediction error, result in the prediction error E. At 325, the motion compensator 340 uses the reconstructed motion vectors MV for accessing or interpolating the reference block 105r and applying the prediction error E, thereto, resulting in the recovered block 105.

Figure 4:
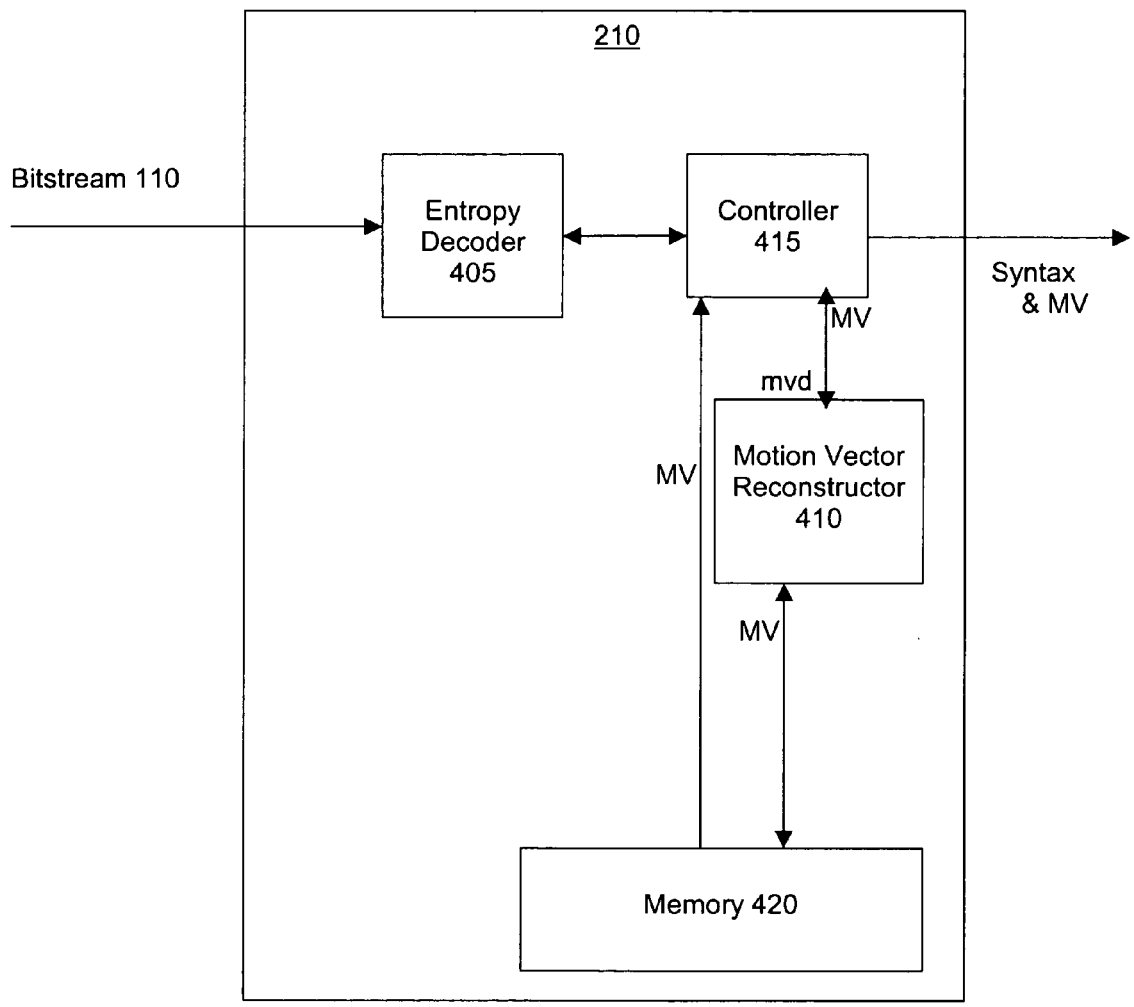
FIG. 4 is a block diagram of an exemplary circuit for entropy decoding and motion vector reconstruction in accordance with an embodiment of the present invention.

Referring now to FIG. 4, there is illustrated a block diagram of an exemplary circuit 210 in accordance with an embodiment of the present invention. The circuit 210 comprises an entropy decoder 405, a motion vector reconstructor 410, and a controller 415.

The circuit 210 receives an entropy encoded bitstream 110. The entropy decoder 405 decodes the entropy encoded bitstream, resulting in decoded syntax elements. The controller 415 provides the syntax elements that are motion vector deltas to the motion vector reconstructor 410. The motion vector reconstructor 410 reconstructs the motion vectors MV. In certain embodiments of the present invention, the reconstructed motion vectors MV can be written to a memory 420.

Where the existence of certain syntax elements depends on the motion vectors, the controller 415 determines the existence of those syntax elements based on the values of reconstructed motion vectors MV from the motion vector reconstructor 410 and indicates the decision to the entropy decoder 405. Alternatively, the controller 415 could provide the reconstructed motion vectors MV, or information therefrom, to the entropy decoder 405, and the entropy decoder 405 determines the existence of the certain syntax elements from the reconstructed motion vectors MV, or information therefrom. The circuit 210 outputs the motion vectors MV and syntax elements.

In certain embodiments of the present invention, the entropy decoder 405 can be an entropy pre-processor, such as the entropy preprocessor described in "System and Method for Entropy Code Preprocessing", U.S. Application for patent application Ser. No. 10/273,744, filed Oct. 18, 2002, by MacInnis et. al., which is incorporated herein by reference for all purposes. The term "entropy decoder" shall be understood to include entropy preprocessors. The term "entropy decoding" shall be understood to include entropy preprocessing.

In certain embodiments of the present invention, the controller 410 can discard the motion vectors MV. Additionally, the controller 410 can have the motion vector reconstructor 415 reconstruct the portion of the motion vectors MV that are needed for the entropy decoding. In the foregoing cases, the controller would output the motion vector deltas mvd or a combination of reconstructed motion vectors MV and motion vector deltas mvd.

Figure 5:
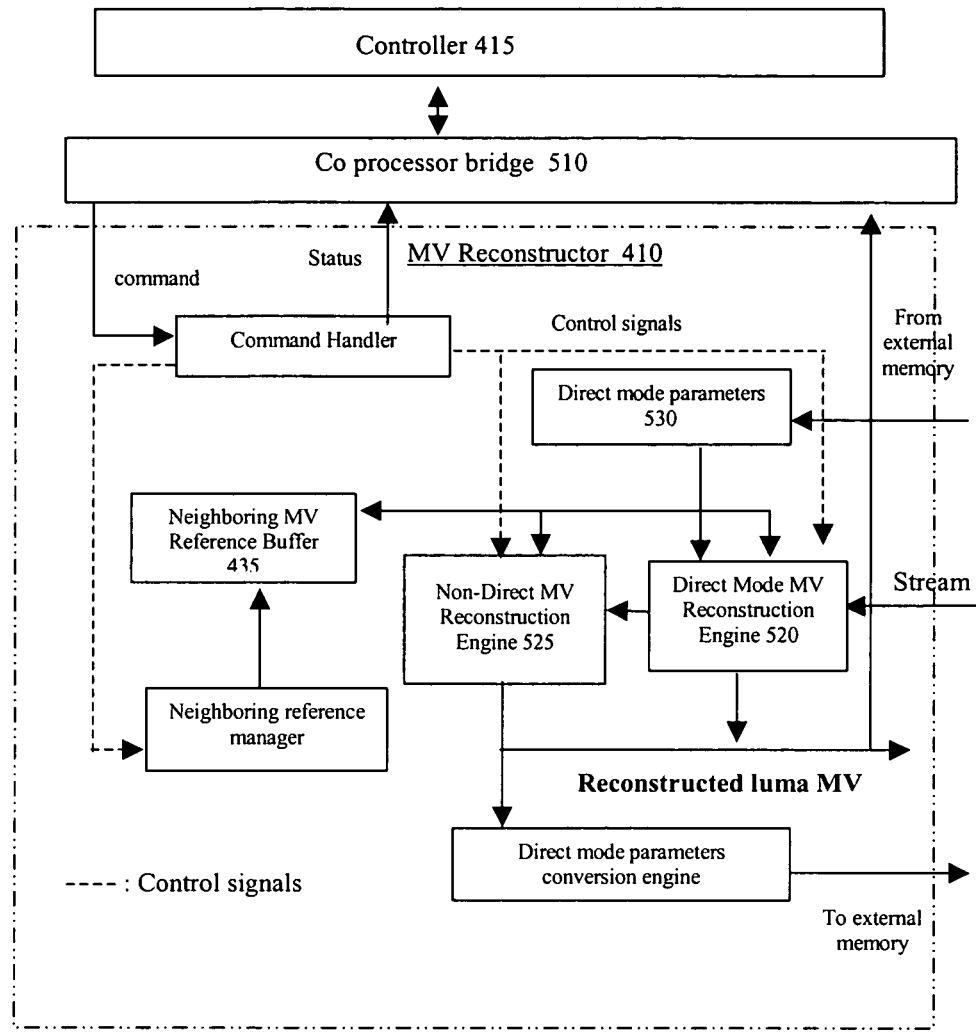
FIG. 5 is a block diagram of an exemplary motion vector reconstructor in accordance with an embodiment of the present invention.

Referring now to FIG. 5 there is illustrated a block diagram of an exemplary motion vector reconstructor 410 in accordance with an embodiment of the present invention. This motion vector reconstructor 410 acts as a Co-processor to the controller 415 and controls its operation through a Co-processor bridge 510. The processor 505 provides the relevant control parameters for the Co-processor 515 to act. The reconstructed motion vectors are either returned to the controller 415 or stored in memory 420 (either or both external memory and an internal neighboring reference buffer, as applicable) for further processing. There are two H/W accelerators one—for Direct mode MV 520 reconstruction and other for non-direct mode MV 525 reconstruction.

The reconstructed luma motion vectors are converted into Direct mode parameters 530 and then stored in external memory for the picture, so that they may be used for performing a Direct mode algorithm in the future. For pictures types where MV reconstruction is applicable, the neighboring MV reference buffer 535 stores the reconstructed motion vectors for the top row and left macro block.

Each of these engines 520, 525 are controlled by the controller 415 based on properties of the specific macro block and picture, which are provided by the controller 415. The controller 415 issues specific commands, based on the properties of the macro block and number of motion compensation blocks within a macro block. Each of these commands is executed by the MV reconstruction engines 520, 525. The Non-Direct Mode Motion Vector Reconstruction Engine 525 first calculates the motion vector predictor and then uses the motion vector delta to calculate the motion vector.

The embodiments described herein may be implemented as a board level product, as a single chip, application specific integrated circuit (ASIC), as part of an ASIC containing other functions, or with varying levels of the decoder system integrated with other portions of the system as separate components.

The degree of integration of the decoder system may primarily be determined by the speed and cost considerations. Because of the sophisticated nature of modern processor, it is possible to utilize a commercially available processor, which may be implemented external to an ASIC implementation. If the processor is available as an ASIC core or logic block, then the commercially available processor can be implemented as part of an ASIC device wherein certain functions can be implemented in firmware. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope.

For example, while the embodiments described herein may have a particular emphasis on the VC-1 compression standard, it is noted that the invention is not limited to the VC-1 compression standard and may be used with a variety of other compression standards.

Therefore, it is intended that the present invention not be limited to the particular embodiment disclosed, but that the present invention will include all embodiments falling within the scope of the appended claims.

What is claimed is:

1. A method for decoding a bitstream, said method comprising:
    reconstructing at least one motion vector from the bitstream at a first stage in a pipeline;
    determining whether a syntax element is present in the bitstream based at least in part on reconstruction of the at least one motion vector;
    responsive to the syntax element being present, parsing the syntax element from the bitstream; and
    based at least in part on the parsed syntax element, reconstructing another motion vector, the another motion vector reconstructed by a non-direct mode motion vector reconstruction engine further based at least in part on a motion vector delta.

2. The method of claim 1, further comprising:
    inverse quantizing a quantized and transformed prediction error associated with the at least one reconstructed motion vector after reconstructing the at least one motion vector.

3. The method of claim 1, further comprising:
    inverse transforming a transformed prediction error associated with the at least one reconstructed motion vector after reconstructing the at least one motion vector.

4. The method of claim 1, further comprising:
    separating syntax elements not representing motion vectors from values representing motion vectors after reconstructing the at least one motion vector at another stage in the pipeline.

5. The method of claim 4, wherein the values representing motion vectors are motion vector deltas.

6. The method of claim 1, further comprising:
    converting the at least one motion vector into at least one direct mode parameter;
    storing the at least one direct mode parameter in a memory; and
    reconstructing the another motion vector further based at least in part on a direct mode algorithm applied to the at least one direct mode parameter.

7. A pipeline for decoding a bitstream, said pipeline comprising:
    a first stage for entropy decoding codes in the bitstream and reconstructing at least one motion vector, wherein entropy decoding the codes further comprises entropy decoding, with the reconstructed at least one motion vector, the codes; and
    a second stage for parsing syntax elements and separating the at least one reconstructed motion vector from a quantized transformed prediction error;
    at least one of the first stage or the second stage configured to reconstruct at least one other motion vector, by a non-direct mode motion vector reconstruction engine, based at least in part on a motion vector delta.

8. The pipeline of claim 7, wherein the pipeline further comprises:
a third stage for inverse quantizing the quantized transformed prediction error, thereby resulting in a transformed prediction error.

9. The pipeline of claim 8, wherein the pipeline further comprises:
a fourth stage for inverse transforming the transformed prediction error.

10. The pipeline of claim 7, wherein the first stage entropy decodes the entropy codes based at least in part on the at least one reconstructed motion vector.

11. The pipeline of claim 7, wherein the first stage further comprises:
an entropy decoder for entropy decoding at least some of the entropy codes;
a motion vector reconstructor for reconstructing the at least one motion vector; and
a feedback loop providing the at least one motion vector to the entropy decoder.

12. The pipeline of claim 11, wherein the first stage further comprises:
a controller for entropy decoding at least one of the entropy codes, based at least in part on the at least one reconstructed motion vector.

13. The pipeline of claim 11, wherein the first stage further comprises:
a controller for providing the at least one reconstructed motion vector or information from the at least one reconstructed motion vector to the entropy decoder; and
wherein the entropy decoder entropy decodes at least one of the entropy codes based at least in part on the at least one reconstructed motion vector or information from the at least one motion vector.

14. A pipeline for decoding a bitstream, said pipeline comprising:
a first stage operable to reconstruct at least one motion vector from the bitstream; and
a second stage connected to the first stage, the second stage operable to separate syntax elements not representing motion vectors from values representing motion vectors after the first stage reconstructs the at least one motion vector;
at least one of the first stage or the second stage configured to reconstruct at least one other motion vector, by a non-direct mode motion vector reconstruction engine, based at least in part on a motion vector delta.

15. The pipeline of claim 14, wherein the first stage is operable to entropy decode the bitstream with the at least one reconstructed motion vector.

16. The pipeline of claim 14, further comprising:
a third stage, connected to the second stage, said third stage operable to inverse quantize a quantized and transformed prediction error associated with the at least one reconstructed motion vector after the first stage reconstructs the at least one motion vector.

17. The pipeline of claim 14, further comprising:
a third stage connected to the second stage, the third stage operable to inverse transform a transformed prediction error associated with the at least one reconstructed motion vector after reconstructing the at least one motion vector.

18. The pipeline of claim 14, wherein the values deltas representing motion vectors are motion vector deltas.

19. A method for decoding a bitstream, comprising:
parsing, by a first stage in a pipeline, at least a portion of a macroblock header from the bitstream;
reconstructing, by the first stage in the pipeline, at least one motion vector;
determining a presence of a syntax element in the bitstream;
based at least in part on the determination, parsing the syntax element from the bitstream;
converting the at least one motion vector into at least one direct mode parameter;
storing the at least one direct mode parameter in a memory; and
based at least in part on the parsed syntax element and a direct mode algorithm applied to the at least one direct mode parameter, reconstructing an additional motion vector.

20. The method of claim 19, wherein determining the presence of the syntax element in the incoming bitstream is based at least in part on values of the at least one reconstructed motion vector.

21. A system for decoding a bitstream, comprising:
means for reconstructing at least one motion vector from the bitstream at a first stage in a pipeline;
means for determining whether a syntax element is present in the bitstream based at least in part on reconstruction of the at least one motion vector;
means for parsing the syntax element from the bitstream responsive to the syntax element being present; and
means for reconstructing another motion vector based at least in part on the parsed syntax element, the means for reconstructing the another motion vector comprising a non-direct mode motion vector reconstruction engine configured to reconstruct the another motion vector further based at least in part on a motion vector delta.

22. The system of claim 21, further comprising means for inverse quantizing a quantized and transformed prediction error associated with the at least one reconstructed motion vector after reconstructing the at least one motion vector.

* * * * *